(12) United States Patent
Kratz et al.

(10) Patent No.: US 9,069,415 B2
(45) Date of Patent: Jun. 30, 2015

(54) SYSTEMS AND METHODS FOR FINGER POSE ESTIMATION ON TOUCHSCREEN DEVICES

(71) Applicant: FUJI XEROX CO., LTD., Tokyo (JP)

(72) Inventors: Sven Kratz, San Jose, CA (US); Patrick Chiu, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 68 days.

(21) Appl. No.: 13/868,057

(22) Filed: Apr. 22, 2013

(65) Prior Publication Data

US 2014/0313136 A1 Oct. 23, 2014

(51) Int. Cl.
*G06F 3/041* (2006.01)
*G06F 3/042* (2006.01)

(52) U.S. Cl.
CPC ............ *G06F 3/0425* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2004/0095318 A1* | 5/2004 | Morrison et al. | 345/158 |
| 2007/0300182 A1* | 12/2007 | Bilow | 715/799 |
| 2008/0199071 A1* | 8/2008 | Gu | 382/154 |
| 2010/0066667 A1* | 3/2010 | MacDougall et al. | 345/156 |
| 2012/0314031 A1* | 12/2012 | Shotton et al. | 348/46 |
| 2013/0002649 A1* | 1/2013 | Wu et al. | 345/419 |

OTHER PUBLICATIONS

Boring, S., et al. The Fat Thumb: Using the Thumb's Contact Size for Sin-gle-Handed Mobile Interaction. Research Report 2011-1015-27, Dept. of Comp. Science,Univ. of Calgary.
Holz, C. and Baudisch, P., The Generalized Perceived Input Point Model and How to Double Touch Accuracy by Extracting Fingerprints. In Proceedings of CHI '10, 581-590.
Holz, C. and Baudisch, P..Unaerstanaing Touch. In Proceedings of CHI '11, 2501-2510.
Radu Bogdan Rusu and Steve Cousins, 3D is here: Point Cloud Library (PCL), IEEE International Conference on Robotics and Automation (ICRA), Shanghai, China, 2011.
Horn, B., Closed-form solution of absolute orientation using unit quaternions. J. Opt. Soc. Am. A, 4, 629-642 (1987).
Wilson, A. et al. Combining Multiple Depth Cameras and Projectors for Interactions on, Above, and Between Surfaces. UIST'10, Oct. 3-6, 2010, New York, NY, USA, 273-282.

* cited by examiner

*Primary Examiner* — Nicholas Lee
(74) *Attorney, Agent, or Firm* — TransPacific Law Group; Pavel Pogodin, Esq.

(57) ABSTRACT

Described are systems and methods for estimating finger pose of a user during a tactile input event. In one implementation, the system incorporates: a touch-sensitive display device configured to detect a tactile event and to determine a contact point of an object and the touch-sensitive display device, the contact point associated with the tactile event; a camera configured to capture an image of an area proximal to the surface of the touch-sensitive display device; and a central processing unit configured, in response to the detection of the tactile event, to determine information on a pose of the object based on the captured image and the determined contact point.

20 Claims, 7 Drawing Sheets

SYSTEMS AND METHODS FOR FINGER POSE ESTIMATION ON TOUCHSCREEN DEVICES

BACKGROUND OF THE INVENTION

1. Technical Field

The disclosed embodiments relate in general to user interfaces of computing devices and, more specifically, to systems and methods for finger pose estimation on touch screen devices.

2. Description of the Related Art

Tactile input is now the preferred input method on mobile devices such as smartphones or tablets. Tactile input is also gaining traction in the desktop computer system segment and is also becoming more commonly used for interaction with large table or wall-based displays. Using the conventional technology, touchscreen displays can only recognize the point (coordinates) of tactile contact as the user input. Most capacitive touchscreens can also report the size of a contact area associated with a tactile event as described, for example, in Boring, S., Ledo, D., Chen, X., Marquardt, N., Tang, A. and Greenberg, S., The Fat Thumb: Using the Thumb's Contact Size for Single-Handed Mobile Interaction, In Proceedings of the ACM SIGCHI's International Conference on Human-Computer Interaction with Mobile Devices and Services (Mobile HCI 2012). San Francisco, Calif., USA, 10 pages, September 21-24. However, no further information about the individual tactile input event is available using the conventional tactile input devices.

For many application, it would, however, be beneficial to capture further information related to the user-initiated tactile event, such as user finger's rotation around the vertical axis (orthogonal to the plane of the touch screen) as well as its tilt. Obtaining rotation and tilt information for a tactile input event would allow for expressive localized input gestures as well as new types of on-screen widgets that make use of the additional local input degrees of freedom.

Therefore, new and improved systems and methods for receiving tactile input from users are needed.

SUMMARY OF THE INVENTION

The embodiments described herein are directed to methods and systems that substantially obviate one or more of the above and other problems associated with conventional tactile input devices.

In accordance with one aspect of the novel concepts described herein, there is provided a computer-implemented method performed in a computerized system comprising a central processing unit, a touch-sensitive display device, a memory and a camera. The computer-implemented method involves: using the touch-sensitive display device to detect a tactile event; using the camera to capture an image of an area proximal to the surface of the touch-sensitive display device; using the touch-sensitive display device to determine a contact point of an object and the touch-sensitive display device, the contact point associated with the tactile event; and responsive to the detection of the tactile event, using the central processing unit to determine information on a pose of the object based on the captured image and the determined contact point.

In accordance with another aspect of the novel concepts described herein, there is provided a non-transitory computer-readable medium embodying a set of computer-executable instructions, which, when executed in a computerized system comprising a central processing unit, a touch-sensitive display device, a memory and a camera, cause the computerized system to perform a method involving: using the touch-sensitive display device to detect a tactile event; using the camera for capturing an image of an area proximal to the surface of the touch-sensitive display device; using the touch-sensitive display device to determine a contact point of an object and the touch-sensitive display device, the contact point associated with the tactile event; and responsive to the detection of the tactile event, using the central processing unit to determine information on a pose of the object based on the captured image and the determined contact point.

In accordance with yet another aspect of the novel concepts described herein, there is provided a computerized system incorporating: a touch-sensitive display device configured to detect a tactile event and to determine a contact point of an object and the touch-sensitive display device, the contact point associated with the tactile event; a camera configured to capture an image of an area proximal to the surface of the touch-sensitive display device; and a central processing unit configured, in response to the detection of the tactile event, to determine information on a pose of the object based on the captured image and the determined contact point.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The techniques described herein use a depth-imaging camera to estimate tilt and rotation parameters of objects used for tactile input. As well known in the art, depth-imaging cameras provide conventional (sometimes color) images as well as depth information for each pixel in the acquired images (depth images). In one or more embodiments, there is provided a computerized system incorporating a touchscreen and at least one depth camera arranged as described below. The aforesaid touchscreen and the depth camera(s) are used in conjunction with the software modules described herein to augment the touchscreen input with finger pose estimation, which improves the state of the art of user touchscreen interaction. The term pose used herein means spatial orientation as determined, for example, by tilt and rotation parameters.

Figure 1:
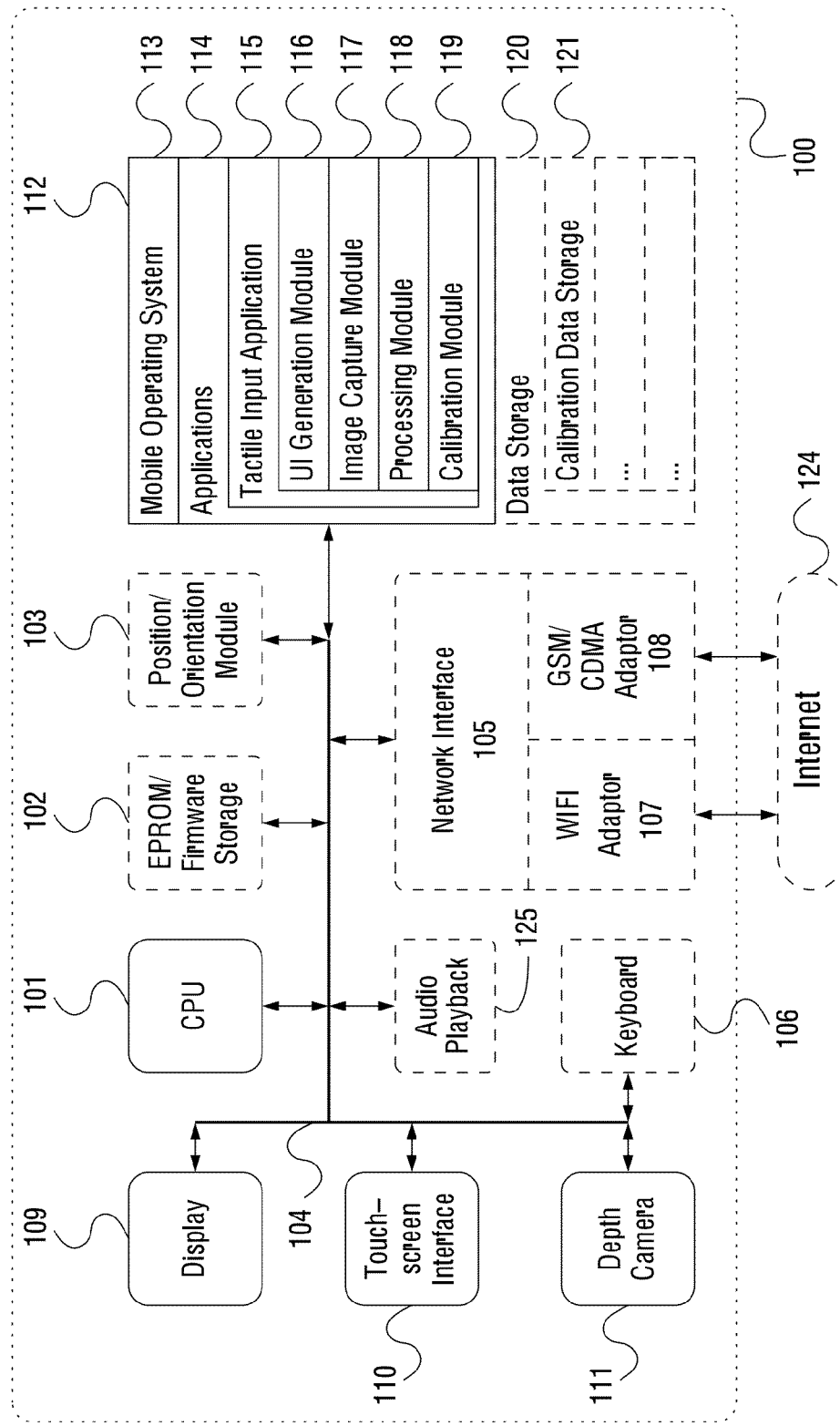
FIG. 1 illustrates an exemplary embodiment of an inventive computerized mobile system for enabling finger pose estimation during tactile events.

FIG. 1 illustrates an exemplary embodiment of a computerized mobile system 100 for enabling the aforesaid finger pose estimation during tactile events. In one or more embodiments, the computerized mobile system 100 may be implemented within the form factor of a mobile computing device, such as a smartphone, a personal digital assistant (PDA), or a tablet computer, all of which are available commercially and are well known to persons of skill in the art. In an alternative embodiment, the computerized mobile system 100 may be implemented based on a laptop or a notebook computer. Yet in an alternative embodiment, the computerized mobile system 100 may be an embedded system, incorporated into an electronic device with certain specialized functions, such as an electronic book (or e-book) reader.

The computerized mobile system 100 may include a data bus 104 or other interconnect or communication mechanism for communicating information across and among various hardware components of the computerized mobile system 100, and a central processing unit (CPU or simply processor) 101 electrically coupled with the data bus 104 for processing information and performing other computational and control tasks. Computerized system 100 also includes a memory 112, such as a random access memory (RAM) or other dynamic storage device, coupled to the data bus 104 for storing various information as well as instructions to be executed by the processor 101. The memory 112 may also include persistent storage devices, such as a magnetic disk, optical disk, solid-state flash memory device or other non-volatile solid-state storage devices.

In one or more embodiments, the memory 112 may also be used for storing temporary variables or other intermediate information during execution of instructions by the processor 101. Optionally, computerized mobile system 100 may further include a read only memory (ROM or EPROM) 102 or other static storage device coupled to the data bus 104 for storing static information and instructions for the processor 101, such as firmware necessary for the operation of the computerized mobile system 100, basic input-output system (BIOS), as well as various configuration parameters of the computerized mobile system 100.

In one or more embodiments, the computerized mobile system 100 may incorporate a display device 109, which may be also electrically coupled to the data bus 104, for displaying various information to a user of the computerized mobile system 100. In an alternative embodiment, the display device 109 may be associated with a graphics controller and/or graphics processor (not shown). The display device 109 may be implemented as a liquid crystal display (LCD), manufactured, for example, using a thin-film transistor (TFT) technology or as an organic light emitting diode (OLED) display, both of which are well known to persons of ordinary skill in the art. In various embodiments, the display device 109 may be incorporated into the same general enclosure with the remaining components of the computerized mobile system 100. In an alternative embodiment, the display device 109 may be positioned outside of such enclosure.

In one or more embodiments, the computerized mobile system 100 may further incorporate an audio playback device 125 electrically connected to the data bus 104 and configured to play various audio files, such as MPEG-3 files, or audio tracks of various video files, such as MPEG-4 files, well known to persons of ordinary skill in the art. To this end, the computerized mobile system 100 may also incorporate waive or sound processor or a similar device (not shown).

In one or more embodiments, the computerized mobile system 100 may incorporate one or more input devices, such as a touchscreen interface 110 for receiving user's tactile commands. The touchscreen interface 110 may operate based on resistive, acoustic, capacitive or other physical principles or effects well known to persons of skill in the art. The touchscreen interface 110 used in conjunction with the display device 109 enables the display device 109 to possess touchscreen functionality. Thus, the display device 109 working together with the touchscreen interface 110 may be referred to herein as a touch-sensitive display device or simply as a "touchscreen."

The computerized mobile system 100 may further incorporate a depth-imaging camera 111 for capturing images or video used in finger pose estimation as well as a keyboard 106, which all may be coupled to the data bus 104 for communicating information, including, without limitation, images and video, as well as user commands to the processor 101. In one embodiment, input devices may also include touch-sensitive devices (not shown) positioned on the back side (opposite to the front, display side) of the computerized mobile system 100.

In one or more embodiments, the computerized mobile system 100 may additionally include a positioning and orientation module 103 configured to supply data on the current geographical position, spatial orientation as well as acceleration of the computerized mobile system 100 to the processor 101 via the data bus 104. The geographical position information may be obtained by the positioning module 103 using, for example, global positioning system (GPS) technology and/or other positioning techniques such as by using information provided by proximate cell towers and/or WIFI hotspots. The acceleration data is supplied by one or more accelerometers incorporated into the positioning and orientation module 103. Finally, the orientation information may be obtained using acceleration measurements in all 3 axes, including the gravity. In one or more embodiments, the position, orientation and acceleration metadata provided by the positioning and orientation module 103 is continuously recorded and stored in the data storage unit 120.

In one or more embodiments, the computerized mobile system 100 may additionally include a communication interface, such as a network interface 105 coupled to the data bus 104. The network interface 105 may be configured to establish a connection between the computerized mobile system 100 and the Internet 124 using at least one of a WIFI interface 107 and/or a cellular network (GSM or CDMA) adaptor 108. The network interface 105 may be configured to enable a two-way data communication between the computerized mobile system 100 and the Internet 124. The WIFI adaptor 107 may operate in compliance with 802.11a, 802.11b, 802.11g and/or 802.11n protocols as well as Bluetooth protocol well known to persons of ordinary skill in the art. In an exemplary implementation, the WIFI adaptor 107 and the cellular network (GSM or CDMA) adaptor 108 send and receive electrical or electromagnetic signals that carry digital data streams representing various types of information.

In one or more embodiments, the Internet 124 typically provides data communication through one or more sub-networks to other network resources. Thus, the computerized mobile system 100 is capable of accessing a variety of network resources located anywhere on the Internet 124, such as remote media servers, web servers, other content servers as well as other network data storage resources. In one or more embodiments, the computerized mobile system 100 is configured to send and receive messages, media and other data, including application program code, through a variety of network(s) including the Internet 124 by means of the network interface 105. In the Internet example, when the computerized mobile system 100 acts as a network client, it may request code or data for an application program executing on the computerized mobile system 100. Similarly, it may send various data or computer code to other network resources.

In one or more embodiments, the functionality described herein is implemented by computerized mobile system 100 in response to processor 101 executing one or more sequences of one or more instructions contained in the memory 112. Such instructions may be read into the memory 112 from another computer-readable medium. Execution of the sequences of instructions contained in the memory 112 causes the processor 101 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 101 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 301 for execution. For example, the instructions may initially be carried on a magnetic disk from a remote computer. Alternatively, a remote computer can load the instructions into its dynamic memory and send the instructions over the Internet 124. Specifically, the computer instructions may be downloaded into the memory 112 of the computerized mobile system 100 from the foresaid remote computer via the Internet 124 using a variety of network data communication protocols well known in the art.

In one or more embodiments, the memory 112 of the computerized mobile system 100 may store any of the following software programs, applications or modules:

1. Operating system (OS) 113, which may be a mobile operating system for implementing basic system services and managing various hardware components of the computerized mobile system 100. Exemplary embodiments of the operating system 113 are well known to persons of skill in the art, and may include any now known or later developed mobile operating systems.

2. Applications 114 may include, for example, a set of software applications executed by the processor 101 of the computerized mobile system 100, which cause the computerized mobile system 100 to perform certain predetermined functions, such as capture images or video using the depth-imaging camera 111 or detect user's tactile input using the touchscreen interface 110. In one or more embodiments, the applications 114 may include an inventive tactile input application 115, described in detail below.

3. Data storage 120 may include, for example, calibration data storage 121 for storing the calibration data generated by the calibration module 119.

In one or more embodiments, the inventive tactile input application 115 incorporates a user interface generation module 116 configured to generate a user interface on the display 109 of the computerized mobile system 100. The inventive tactile input application 115 may further include an image capture module 117 for causing the depth-imaging camera 111 to capture, for example, the image of user's hand, a processing module 118 for processing the captured image to determine the finger pose on the touchscreen as well as a calibration module 119 for performing a calibration operation described in detail below.

Figure 2:
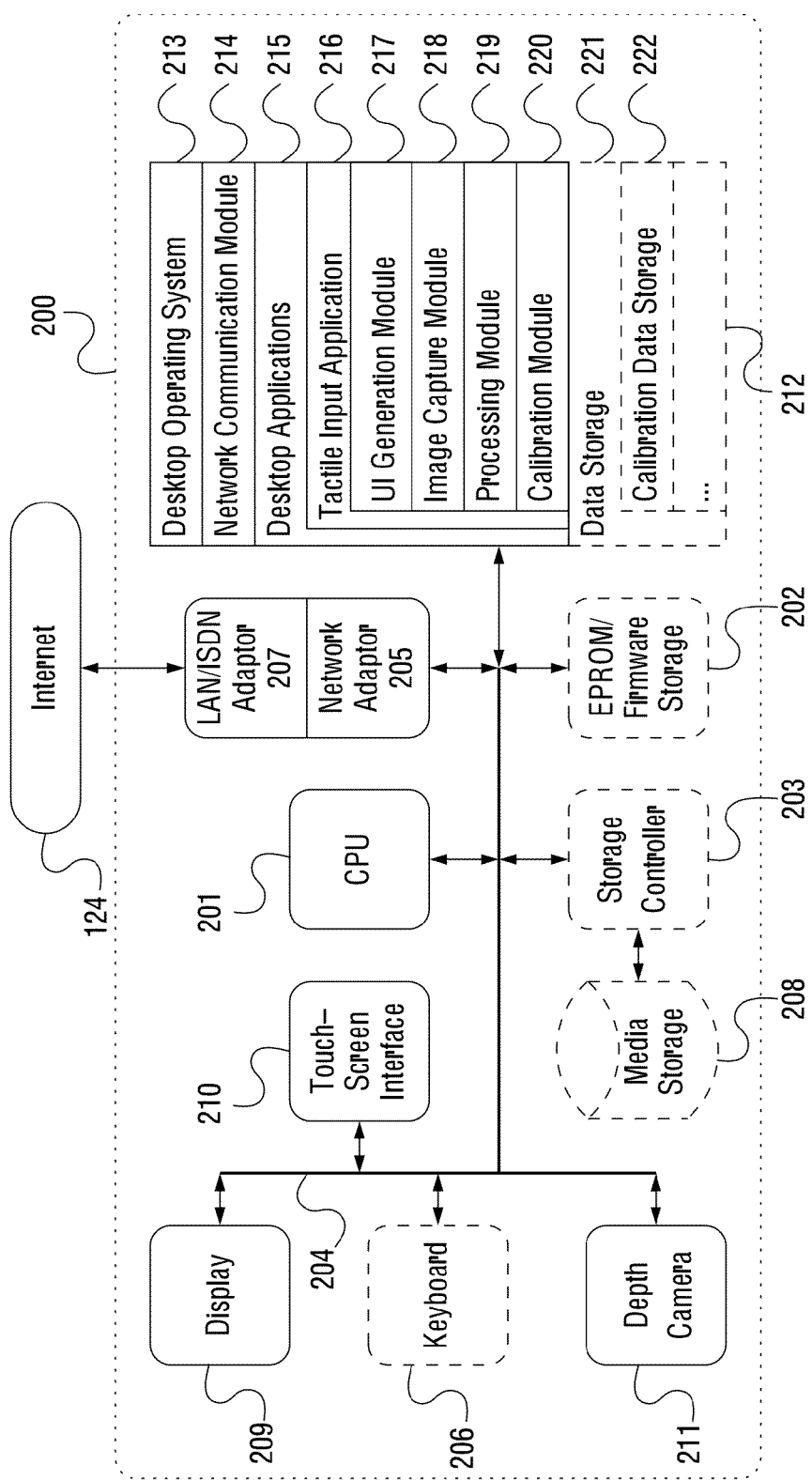
FIG. 2 illustrates an exemplary embodiment of an inventive computerized desktop system for enabling finger pose estimation during tactile events.

In an alternative embodiment, the inventive techniques for enabling finger pose estimation during tactile events described herein may be deployed on a computerized desktop system 200, an exemplary embodiment of which is illustrated in FIG. 2. In one or more embodiments, the computerized desktop system 200 may incorporate a data bus 204, which may be substantially similar and may perform substantially similar functions as the data bus 204 of the computerized system 200 illustrated in FIG. 1. In various embodiments, the data bus 204 may use the same or different interconnect and/or communication protocol as the data bus 204. The one or more processors (CPUs) 201, the network interface 205, the EPROM/Firmware storage 202, the display 209 and the keyboard 206 of the computerized desktop system 200 may be likewise substantially similar to the respective processor 101, the network interface 105, the EPROM/Firmware storage 102, the display 109 and the keyboard 106 of the computerized mobile system 100, except that the former components are deployed in a desktop platform configuration. In various implementations, the one or more processor 201 may have substantially increased processing power as compared with the processor 101.

In addition to the input device 206 (keyboard), the computerized desktop system 200 may additionally include a touchscreen interface 210 for receiving user's tactile commands and a depth camera 211 for capturing images or video used in finger pose estimation.

The LAN/ISDN adaptor 207 of the computerized desktop system 200 may be implemented, for example, using an integrated services digital network (ISDN) card or a modem to provide a data communication connection to a corresponding type of telephone line, which is interfaced with the Internet 124 using Internet service provider's hardware (not shown). As another example, the LAN/ISDN adaptor 207 may be a local area network interface card (LAN NIC) to provide a data communication connection to a compatible LAN and the Internet 124. To store various media files, the computerized desktop system 200 may be provided with a media storage 208 connected to the data bus 204 by means of a storage controller 203.

In one or more embodiments, the memory 212 of the computerized desktop system 200 may store any of the following software programs, applications or modules:

1. Desktop operating system (OS) 213, which may be an operating system for implementing basic system services and managing various hardware components of the computerized desktop system 200. Exemplary embodiments of the desktop operating system 213 are all well known to persons of skill in the art, and may include any now known or later developed operating systems.

2. Network communication module 214 may incorporate, for example, one or more network protocol stacks which are used to establish a networking connection between the computerized desktop system 200 and the various network entities of the Internet 124, such as the computerized mobile system 100, using the network interface 205 working in conjunction with the LAN/ISDN adaptor 207.

3. Desktop applications 215 may include, for example, a set of software applications executed by one or more processors 201 of the computerized desktop system 200, which cause the computerized desktop system 200 to perform certain predetermined functions or tasks. In one or more embodiments, the desktop applications 215 may include inventive tactile input application 216, which may operate in a substantially similar manner to the aforesaid inventive tactile input application 115 of the computerized mobile system 100.

In one or more embodiments, the inventive tactile input application 216 incorporates a user interface generation module 217 configured to generate an user interface on the display 209 of the computerized desktop system 200. The inventive tactile input application 216 may further include an image capture module 218 for causing the depth camera 211 to capture, for example, the image of user's hand, a processing module 219 for processing the captured image to determine the finger pose on the touchscreen as well as a calibration module 220 for performing a calibration operation. The aforesaid modules 217, 218, 219 and 220 of the inventive tactile input application 216 may operate in a substantially similar manner to the respective modules 116, 117, 118 and 119 of the tactile input application 115 deployed on the computerized mobile system 100.

4. Data storage 221 may include, for example, calibration data storage 222 for storing the calibration data generated by the calibration module 220.

Figure 3:
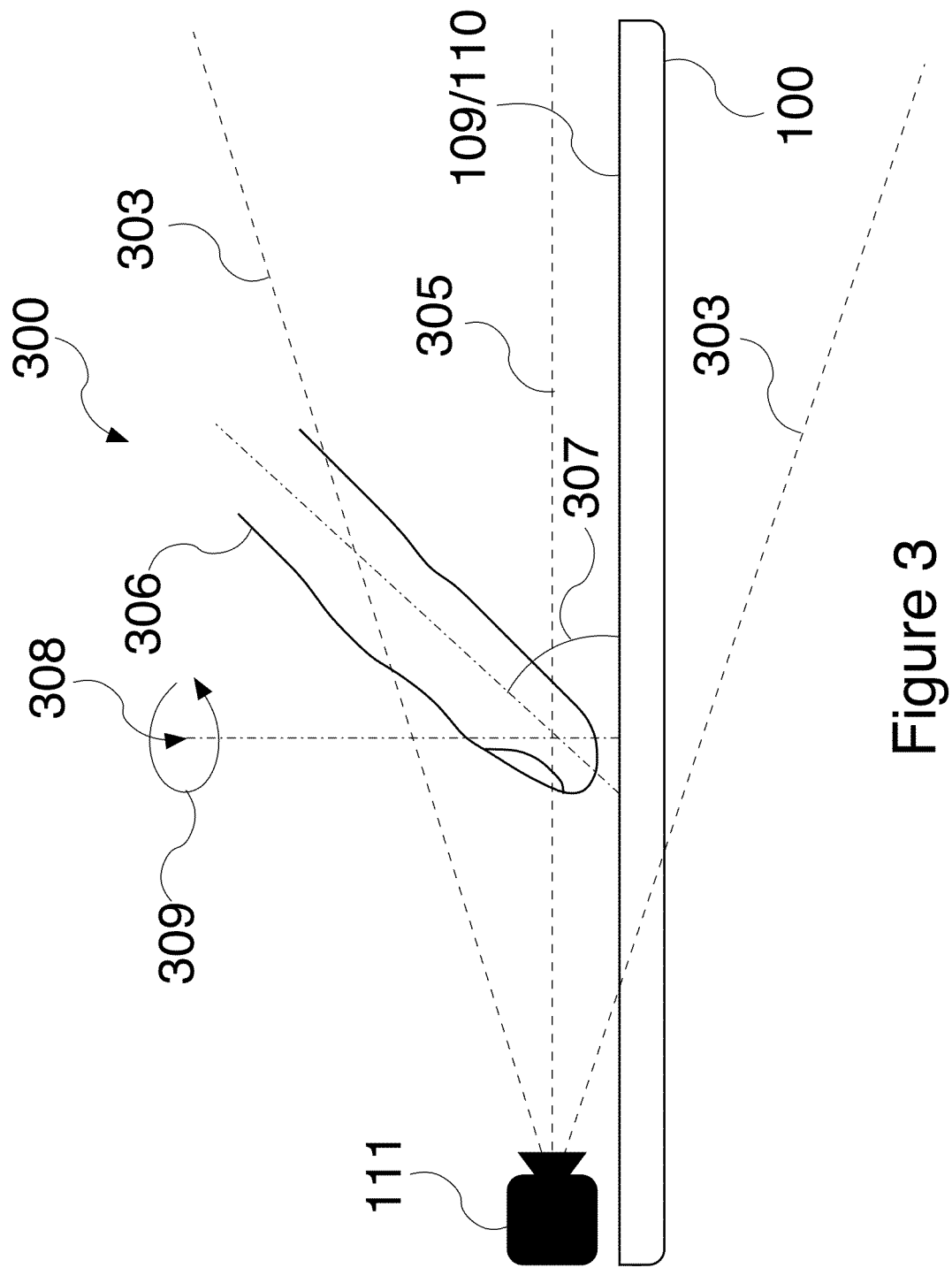
FIG. 3 illustrates an exemplary arrangement of certain specific components of an embodiment of a computerized system for enabling finger pose estimation during tactile events.

FIG. 3 illustrates an exemplary arrangement of certain specific components of an embodiment of a computerized system 300 for enabling the finger pose estimation during tactile events. In the shown embodiment, the depth-imaging camera 111 is incorporated into or attached to the enclosure of the computerized mobile system 100 such that the touchscreen 109/110 of the computerized mobile system 100 is within the field of view 303 of the depth-imaging camera 111. In one or more embodiments, the depth-imaging camera 111 points in a direction 305, which is substantially parallel to the surface of the touchscreen 109/110 of the computerized mobile system 100 in order to acquire optimal images of user's fingers 306 during the tactile events. The shown exemplary arrangement of the depth-imaging camera 111 and the touchscreen 109/110 of the computerized mobile system 100 allows the detection of finger tilt angle 307 relative to the touchscreen 109/110 as well as the finger's rotation (azimuth) angle 309 around the axis 308 perpendicular to the plane of the touchscreen 109/110. Thus, the embodiment 300 illustrated in FIG. 3 is able to capture two additional coordinates associated with the tactile events in two additional degrees of freedom, including the tilt angle 307 as well as rotation (azimuth) angle 309. These two angular variables are provided by the embodiment 300 in addition to the two planar coordinates (x and y) of the point of contact of the finger 306 and the surface of the touchscreen 109/110 during the tactile event. Thus, the described embodiment is capable of producing four spatial coordinates associated with the tactile event.

In an alternative embodiment, the depth-imaging camera 111 may be incorporated into or attached to the display 209 of the computerized desktop system 200 in the manner substantially similar to the one illustrated in FIG. 3. It should be noted that the invention is not limited to only the shown arrangement of the depth-imaging camera 111 and the touchscreen display 109/110 and many other suitable arrangements of these components may be used without departing from the scope and spirit of the invention. The depth-imaging camera 111 may be placed at different positions and pointed at different angles with respect to the touchscreen display 109/110 to acquire images of user's fingers during tactile events.

Figure 4:
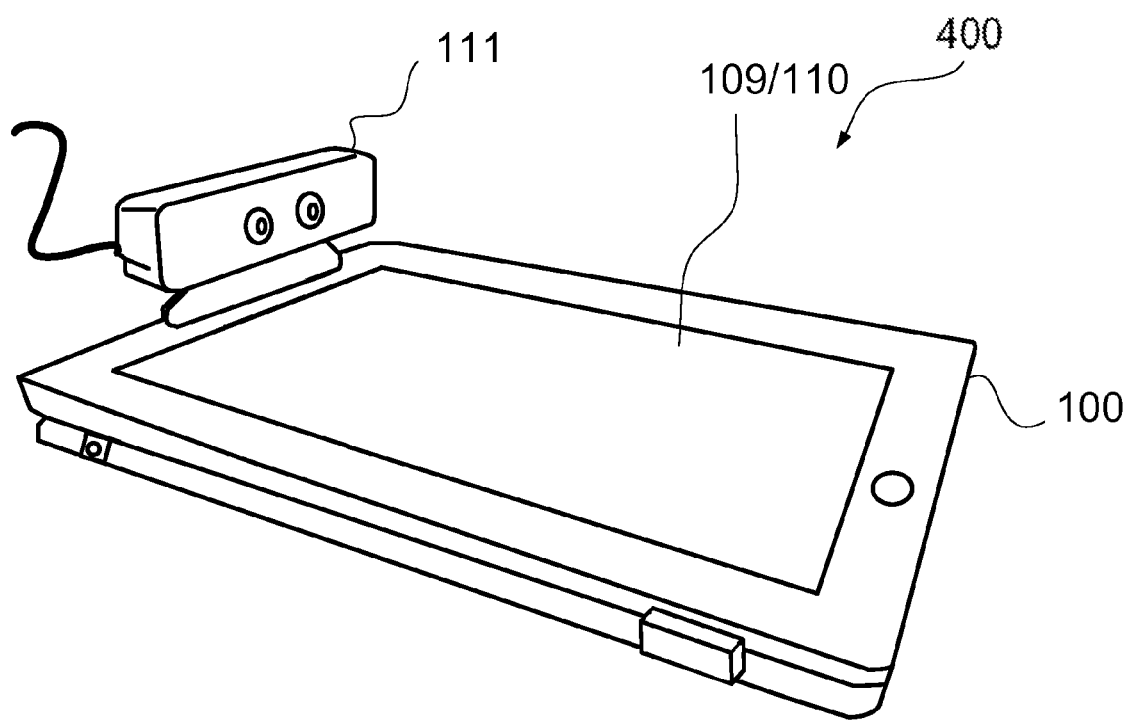
FIG. 4 illustrates an exemplary embodiment of a computerized system 400 for enabling the finger pose estimation during tactile events.

FIG. 4 illustrates an exemplary embodiment of a computerized system 400 for enabling the finger pose estimation during tactile events. The embodiment 400 incorporates a tablet computer 100 with an attached depth-imaging camera 111 positioned such that the touchscreen display 109/110 of the tablet computer 100 is within the field of view of the camera 111. During the tactile events, the depth-imaging camera 111 acquires images of user's fingers (not shown).

The operation of the various software modules deployed on the computerized mobile system 100 and/or the computerized desktop system 200 will now be described in detail. While the below description will most frequently refer to the specific hardware components and software modules of the computerized mobile system 100, it should be understood that the inventive software may be similarly deployed on the computerized desktop system 200.

In one or more embodiments, the inventive tactile input application 115 detects tactile event based on a signal received from the touchscreen interface 110, acquires image of user's fingers using the depth-imaging camera 111 and performs processing of the acquired depth image involving cylinder fitting to a subset of point cloud points that correspond to the representation of one of the user's fingers. Specifically, FIG. 5 illustrates an exemplary operating sequence 500 of an embodiment of a method for finger pose estimation during tactile events.

Figure 5:
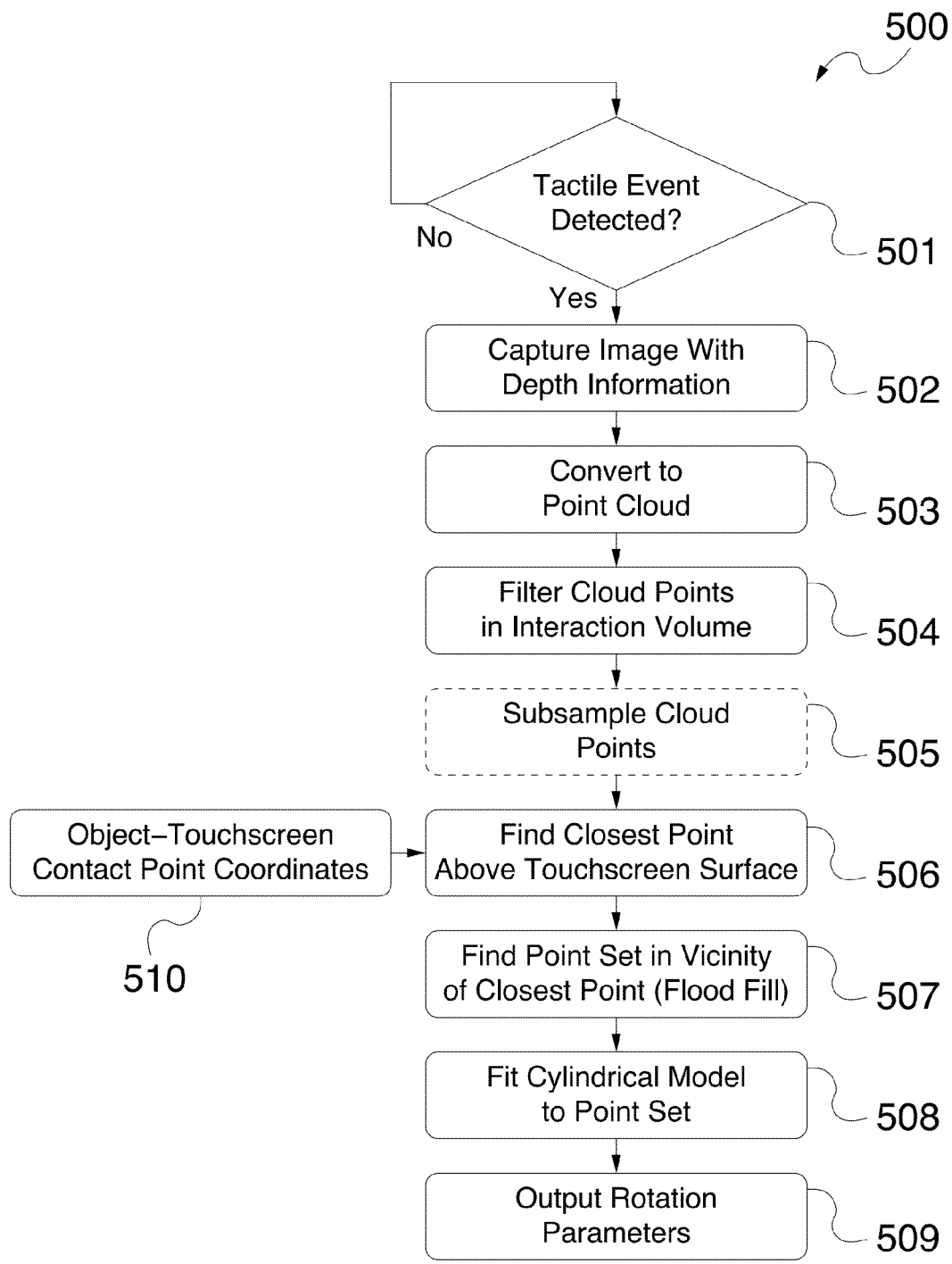
FIG. 5 illustrates an exemplary operating sequence of an embodiment of a method for finger pose estimation during tactile events.

With reference to FIG. 5, at step 501, the tactile input application 115 uses the touchscreen interface 110 to detect a user tactile event. In one or more embodiments, the aforesaid tactile event is initiated by the user in connection with a graphical user interface generated on the display 109 by the user interface generation module 116 of the tactile input application 115, which may include multiple user interface widgets controllable by the user.

Upon the detection of the user tactile event at step 501, the image capture module of the tactile input application 115 is configured to initiate acquisition of one or more images using the depth-imaging camera 111, see step 502. The images acquired by the depth-imaging camera 111 incorporate all the conventional image information as well as depth (distance from the camera to the object) information associated with each pixel in the acquired image. The image obtained by the depth-imaging camera, incorporating the depth information, is called depth image. At step 503, the processing module 118 converts each pixel of the acquired two-dimensional depth input image into a three-dimensional point in the world coordinates. The set of all converted two-dimensional depth image pixels forms the point cloud that is used in the subsequent steps. At step 504, the processing module 118 filters the point clouds obtained at step 503 to select the points that are located in the volume of interest for user interaction with the touchscreen, which is the area where user's finger must be located in order to physically contact the touchscreen. In one embodiment, the volume of interest includes the space within about 15 cm (6 in) directly above the touchscreen.

In one or more embodiments, depending on the resolution of the depth-imaging camera, at step 505, the processing module 118 may be used to reduce the number of points in the point cloud to a manageable number for ease of subsequent processing (subsample or downsample the point cloud). In one exemplary implementation, the point cloud is downsampled using a voxel grid, which is well know to persons of skill in the art. At step 506, the processing module 118 is configured to locate the user's finger interacting with the touchscreen 109/110 by searching for the closest point to the depth-imaging camera 111 located above the plane of the touchscreen 109/110. To aid the closest point identification at this step 506, the coordinates 510 of the finger-touchscreen contact point are used as a seed point.

At step 507, the processing module 118 is configured to find a set of nearest points in the proximity of the closest point identified at step 506. In one embodiment, the nearest-neighbor search algorithm or the flood fill algorithm well known to persons of skill in the art may be used to locate the aforesaid nearest points set. In one exemplary implementation, the processing module 118 may be configured to find a predetermined number N of points nearest to the seed point. In another exemplary implementation, the processing module 118 may be configured to find a set of points, which have a Euclidean distance from the seed point less than a predetermined value.

The found set of the nearest points corresponds to the image representation of the user's finger. At step 508, the processing module 118 performs a cylindrical model fit to the found nearest point set, in order to estimate parameters for the finger's spatial orientation. In one or more embodiments, this is accomplished using random sample consensus (RANSAC) approach well known to persons of ordinary skill in the art.

Finally, at step 509, the rotation quaternion or Euler angles corresponding to the finger's tilt angle 307 and rotation angle 309 are returned as the output. It should be noted that the inventive approach is not limited to the use of only the cylindrical model fit and any other suitable three-dimensional model may be used to approximate the shape of the user's finger. In addition, any other suitable model fitting approach may be used in place of the random sample consensus. It should be also noted that the techniques described herein are not limited to touchscreen interaction using user's fingers. In one or more embodiments, any other object or body part may be usable by the user to interact with the touchscreen 109/110 and an appropriate three-dimensional model may be selected for performing the filtered point cloud fit for each particular interaction object or body part.

In one or more embodiments, the described approach is extended to multi-touch finger pose detection. To this end, the processing module 118 is configured to locate multiple cylinders in the scene that correspond to multiple fingers or other objects touching the touchscreen 109/110. In one or more embodiments, the method described above in connection with FIG. 5 is used for fitting a representation of each finger touching the touchscreen 109/110 in each tactile event. Specifically, the location of each finger-touchscreen contact point is provided by the touchscreen interface 110 of the computerized mobile system 100. Each contact point location is subsequently used as a seeding point in the aforesaid point cloud to seed the points for each finger. As the result, for each finger, the corresponding set of points from the point cloud is selected. Each selected point set is used, in turn, to estimate cylinder fit parameters to obtain the pose (expressed as the rotation quaternion or Euler angles) of the corresponding finger. In one particular embodiment, the aforesaid finger pose estimation algorithm is implemented in C++ programming language using functions from the Point Cloud Library well known to persons of skill in the art and described, for example, in Radu Bogdan Rusu and Steve Cousins, 3D is here: Point Cloud Library (PCL), IEEE International Conference on Robotics and Automation (ICRA), Shanghai, China, 2011.

Figure 6:
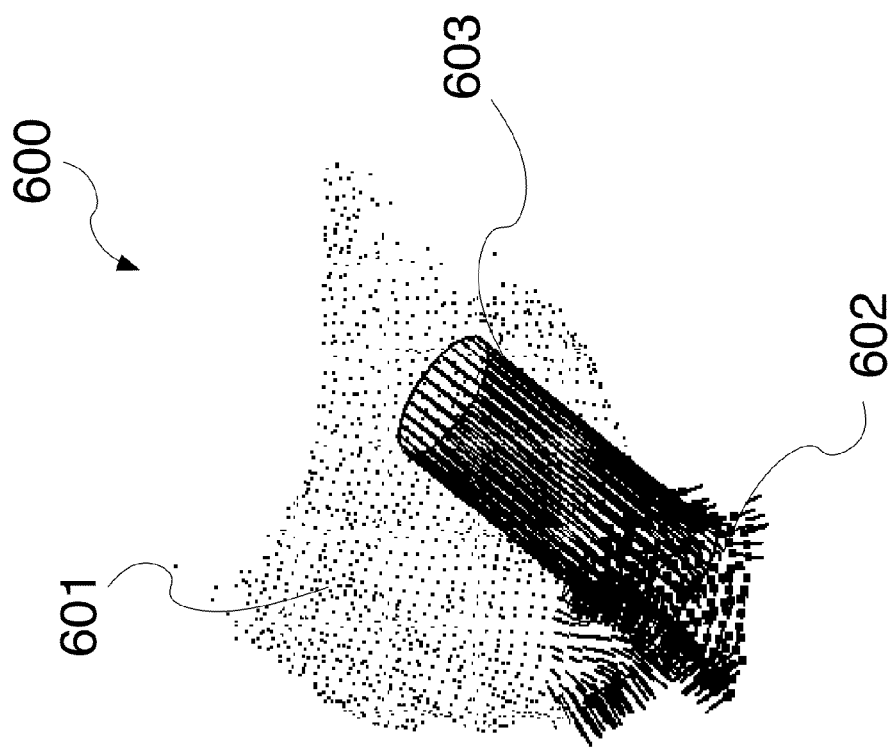
FIG. 6 illustrates a visualization of an exemplary embodiment of a finger pose estimation process.
Figure 6:
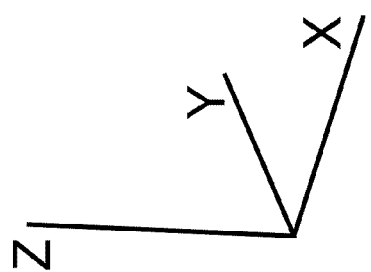

FIG. 6 illustrates a visualization of an exemplary embodiment of a finger pose estimation process. The points 601 of the point cloud correspond to the shape of the user's hand above the touchscreen 109/110 of the computerized mobile system 100. In FIG. 6, the touchscreen 109/110 is located in the X-Y plane. The points 602 correspond to the user's finger touching the touchscreen 109/110 and are separated from the other points of the point cloud. The wireframe cylinder 603 is shown to visualize the inferred rotation and tilt parameters corresponding to the user's finger.

Figure 7:
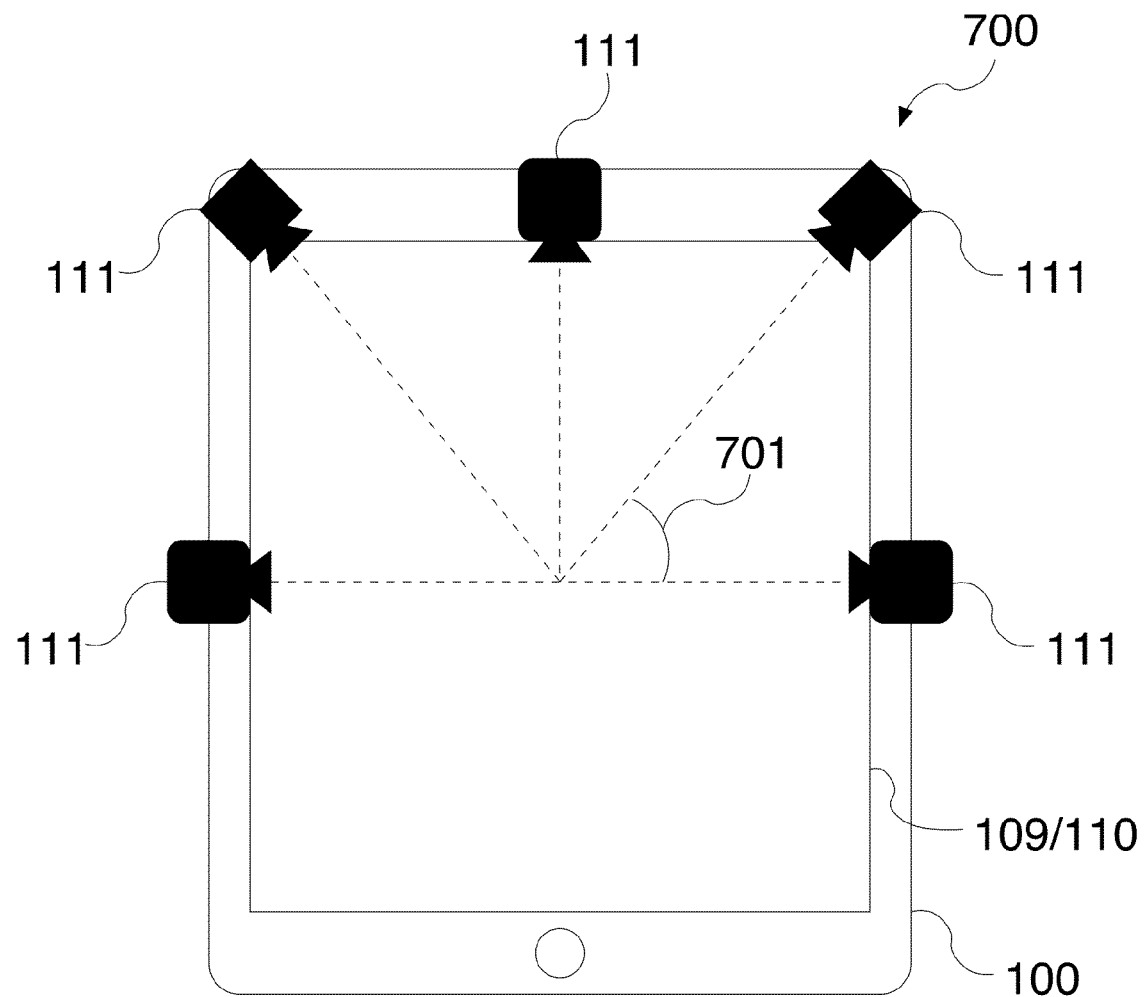
FIG. 7 illustrates an exemplary embodiment of an inventive system for enabling finger pose estimation during tactile events using multiple depth-imaging cameras.

In one or more embodiments, to increase the point cloud effective coverage area, to improve the accuracy of the pose estimation and to mitigate the occlusion effects caused by user's fingers, additional depth-imaging cameras 111 may be disposed in the proximity of the touchscreen 109/110 as illustrated in FIG. 7. In one embodiment, the depth-imaging cameras 111 are positioned such that their individual fields of view overlap in a way that mitigates the occlusions resulting from the user's fingers. For instance, if a combined field of view characterized by an angle of view α is needed to be achieved using N depth-imaging cameras 111, then the cameras 111 are placed at α/N angular increments, designated in FIG. 7 by numeral 701, around the touchscreen 109/110 of the computerized mobile system 100, as illustrated in FIG. 7. It should be noted that the inventive concepts are not limited to only the shown positional arrangement of the multiple depth-imaging cameras 111 and many other configurations of such cameras may be used without departing from the scope and spirit of the invention.

In one or more embodiments, to use multiple point clouds produced by multiple depth-imaging cameras 111, the separate point clouds need to be merged using a calibration process. The calibration process involves devising a transformation table or formula for transforming the local coordinates of a point cloud created by each depth-imaging camera 111 into the coordinates of the merged point cloud. In one or more embodiments, the calibration is performed by acquiring images of certain calibration object(s) placed on the touchscreen 109/110 with each depth-imaging camera 111 and performing the acquired image analysis to determine the coordinates of the same calibration object in the acquired images from multiple cameras. Based on this information, the calibration transformation rules are devised and stored in the calibration data storage 121 of the computerized mobile system 100. It should be also noted that any other suitable calibration process may be used to merge point clouds from different depth-imaging cameras 111 and, therefore, the inventive concepts are not limited to the use of any specific calibration process. Once the multiple camera system is calibrated, point clouds created by individual depth-imaging cameras 111 can be merged to a single point cloud, and the algorithm 500 for finger pose estimation illustrated in FIG. 5 can be used in connection with the merged point cloud.

In one or more embodiments, the images acquired by the depth-imaging cameras 111 of the computerized mobile system 100 are sent via the network interface 105 and the WIFI adaptor 107 to the computerized system 200, which has an increased computing power, for processing. The tilt and rotation information is subsequently transmitted back to the computerized mobile system 100 over the same network. On the computerized mobile system 100, there received tilt and rotation information, in addition to the planar coordinates of the point of contact of user's finger with the touchscreen 109/110 are used to control one or more applications 114.

It should be emphasized that the novel finger pose estimation techniques described herein may be implemented without the use of the touch-sensitive display devices. For example, the same depth-imaging camera(s) 111 or any other now known or later developed devices may be used for finger contact point detection. Thus, the invention is not limited to any specific means for finger contact point detection during the tactile event.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for finger pose estimation on touch screen devices. It is intended that the specification and examples be considered as exemplary only, with a true scope and spirit of the invention being indicated by the following claims.

What is claimed is:

1. A computer-implemented method performed in a computerized system comprising a central processing unit, a touch-sensitive display device, a memory and a camera, the computer-implemented method comprising:
 a. using the touch-sensitive display device to detect a tactile event;
 b. using the camera to capture an image of an area proximal to the surface of the touch-sensitive display device, wherein the camera is a depth-imaging camera and wherein a signal from the camera comprises image information and depth information;
 c. using the touch-sensitive display device to determine a contact point of an object and the touch-sensitive display device, the contact point associated with the tactile event, wherein the touch-sensitive display device is separate and distinct from the camera; and
 d. responsive to the detection of the tactile event, using the central processing unit to determine information on a pose of the object based on the captured image and the determined contact point.

2. The computer-implemented method of claim 1, wherein the camera is positioned on the same side relative to a surface of the touch-sensitive display device as the object contacting the touch-sensitive display device.

3. The computer-implemented method of claim 1, wherein in d. determining the information on the pose of the object comprises obtaining a point cloud from the captured image, the point cloud comprising spatial information associated with the object.

4. The computer-implemented method of claim 3, wherein in d. determining the information on the pose of the object comprises fitting the point cloud with a three-dimensional model.

5. The computer-implemented method of claim 4, wherein the three-dimensional model is a cylindrical model.

6. The computer-implemented method of claim 3, further comprising subsampling the point cloud.

7. The computer-implemented method of claim 1, wherein in c. a plurality of contact points of a plurality of objects and the touch-sensitive display device are determined and wherein in d. information on the pose of the plurality of objects is determined based on the captured image and the plurality of contact points.

8. The computer-implemented method of claim 1, wherein in b. a plurality of images are captured by a plurality of cameras and wherein in d. information on the pose of the object is determined based on the captured plurality of images and the contact point.

9. The computer-implemented method of claim 8, further comprising calibrating the plurality of cameras to determine a transformation from local coordinates of each of the plurality of cameras to a unified coordinate system.

10. The computer-implemented method of claim 1, wherein the camera is positioned such that the touch-sensitive display device is within a field of view of the camera.

11. The computer-implemented method of claim 1, wherein the determined pose information comprises tilt angle and rotation angle of the object.

12. The computer-implemented method of claim 1, further comprising transmitting the determined pose information to an application program.

13. The computer-implemented method of claim 1, further comprising displaying a graphical user interface on the touch-sensitive display device, the graphical user interface comprising a widget, wherein the tactile event is directed to the widget.

14. A non-transitory computer-readable medium embodying a set of computer-executable instructions, which, when executed in a computerized system comprising a central processing unit, a touch-sensitive display device, a memory and a camera, cause the computerized system to perform a method comprising:
 a. using the touch-sensitive display device to detect a tactile event;
 b. using the camera for capturing an image of an area proximal to the surface of the touch-sensitive display device, wherein the camera is a depth-imaging camera and wherein a signal from the camera comprises image information and depth information;

c. using the touch-sensitive display device to determine a contact point of an object and the touch-sensitive display device, the contact point associated with the tactile event; and d. responsive to the detection of the tactile event, using the central processing unit to determine information on a pose of the object based on the captured image and the determined contact point.

15. The non-transitory computer-readable medium of claim 14, wherein the camera is positioned on the same side relative to a surface of the touch-sensitive display device as the object contacting the touch-sensitive display device.

16. The non-transitory computer-readable medium of claim 14, wherein in d. determining the information on the pose of the object comprises obtaining a point cloud from the captured image, the point cloud comprising spatial information associated with the object.

17. The non-transitory computer-readable medium of claim 16, wherein in d. determining the information on the pose of the object comprises fitting the point cloud with a three-dimensional model.

18. The non-transitory computer-readable medium of claim 17, wherein the three-dimensional model is a cylindrical model.

19. The non-transitory computer-readable medium of claim 16, wherein the method further comprises subsampling the point cloud.

20. A computerized system comprising:

a. a touch-sensitive display device configured to detect a tactile event and to determine a contact point of an object and the touch-sensitive display device, the contact point associated with the tactile event;

b. a depth-imaging camera, separate and distinct from the touch-sensitive display device, configured to capture an image of an area proximal to the surface of the touch-sensitive display device, wherein a signal from the camera comprises image information and depth information; and c. a central processing unit configured, in response to the detection of the tactile event, to determine information on a pose of the object based on the captured image and the determined contact point.

* * * * *